United States Patent Office 3,424,701
Patented Jan. 28, 1969

3,424,701
POLYURETHANE COMPOSITIONS
Francis M. Kujawa, Tonawanda, N.Y., assignor to Hooker Chemical Corporation, Niagara Falls, N.Y., a corporation of New York
No Drawing. Continuation-in-part of application Ser. No. 340,776, Jan. 28, 1964. This application Aug. 29, 1967, Ser. No. 663,955
U.S. Cl. 260—2.5                                15 Claims
Int. Cl. C08g 22/10, 22/44; C08k 3/28

ABSTRACT OF THE DISCLOSURE

Polyurethane compositions, and particularly polyurethane foams, having superior properties especially when formed on a substrate by spraying a prefoam composition thereon are prepared by reacting:

(I) An alkyd resin having a hydroxyl number in the range of about 25 to 900 and comprising the reaction product of components comprising (a) an adduct of hexahalocyclopentadiene wherein the halogen is selected from the group consisting of fluorine, chlorine, bromine and mixtures thereof, and a polycarboxylic compound containing aliphatic carbon-to-carbon unsaturation, and (b) a polyhydric alcohol containing at least three hydroxyl groups;

(II) an alkylene oxide addition product of a phenol-aldehyde condensation product;

(III) a neutral phosphorus compound having the formula:

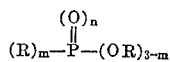

wherein $m$ is an integer from 0 to 3, $n$ is an integer from 0 to 1, and R is selected from the group consisting of alkyl, halogen-substituted alkyl, aralkyl, alkylaryl, and aryl;

(IV) an N,N,N',N'-tetrakis(2-hydroxypropyl)alkylene diamine;

(V) an organic polyisocyanate; and (VI) a foaming agent.

CROSS-REFERENCE TO RELATED APPLICATION

This is a continuation-in-part of application Ser. No. 340,776, filed Jan. 28, 1964, now abandoned.

BACKGROUND OF THE INVENTION

Polyurethane foams have been used extensively for thermal insulation by either employing preformed foam slabs or by forming the foam in place by pouring a foamable composition into a suitable cavity. Recently, interest has grown in the use of polyurethane foam insulation applied by spraying the foamable composition through a constricted zone, such as a nozzle or an orifice onto the desired substrate. This type of operation requires a composition that has special physical and chemical properties to meet the more drastic requirements of this type of application. Moreover, foams intended for building insulation must usually also have a stringent flame spread rating of 25 or lower, in accordance with ASTM E84 test, to be acceptable.

Accordingly, it is an object of this invention to provide a polyurethane composition that has superior physical strength, improved thermal stability and increased hydrolytic stability. Another object of the invention is to provide a polyurethane composition that performs in a superior manner in spray foam applications. It is another object of the invention to provide a polyurethane composition that combines these requirements with a flame spread rating sufficient to meet the stringent building code requirements without the use of inorganic fillers. Another object of the invention is to provide polymer compositions and mixtures to accomplish such results. These and other objects of the invention will become more apparent upon consideration of the following detailed specification.

SUMMARY OF THE INVENTION

In accordance with this invention, there is provided a polyurethane composition comprising:

(I) An alkyd resin having a hydroxyl number in the range of 25 to 900 and comprising the reaction product of components comprising (a) an adduct of hexahalocyclopentadiene wherein the halogen is selected from the group consisting of fluorine, chlorine, bromine and mixtures thereof, and a polycarboxylic compound containing aliphatic carbon-to-carbon unsaturation, and (b) a polyhydric alcohol containing at least three hydroxyl groups;

(II) an alkylene oxide addition product of a phenol-aldehyde condensation product;

(III) a neutral phosphorus compound having the formula:

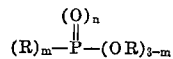

wherein $m$ is an integer from 0 to 3, $n$ is an integer from 0 to 1, and R is selected from the group consisting of alkyl, halogen-substituted alkyl, aralkyl, alkylaryl, and aryl;

(IV) an N,N,N',N'-tetrakis(2-hydroxypropyl)alkylene diamine;

(V) an organic polyisocyanate; and (VI) a foaming agent.

Further in accordance with the invention there are provided compositions of components (I), (II), (III) and (IV), as well as mixtures thereof with a tertiary amine catalyst and/or a foaming agent.

DESCRIPTION OF THE EMBODIMENTS

The halogen-containing alkyd resins of the invention employ an adduct of hexahalocyclopentadiene and a polycarboxylic compound containing aliphatic carbon-to-carbon unsaturation. The polycarboxylic compounds can be a polycarboxylic acid, a polycarboxylic acid anhydride, a polycarboxylic acid ester, a polycarboxylic acid halide or mixtures thereof. Suitable adducts of hexahalocyclopentadiene include 1,4,5,6,7,7 - hexachlorobicyclo - (2.2.1)-5-heptene - 2,3 - dicarboxylic acid; 1,4,5,6,7,7-hexabromobicyclo - (2.2.1)-5-heptene-2,3-dicarboxylic acid; 1,4,5,6-tetrachloro - 7,7 - difluorobicyclo - (2.2.1)-5-heptene-2,3-dicarboxylic acid; 1,4,5,6,7,7-hexachlorobicyclo-(2.2.1)-5-heptene-2-acetic-2-carboxylic acid and the corresponding acid anhydrides, acid halides, and acid esters. The acids and anhydrides are the preferred polycarboxylic compounds.

At least a portion of the total polyhydric alcohol component of the halogen-containing alkyd resins should comprise a polyhydric alcohol containing at least three hydroxyl groups. Where a very rigid foam structure is desired, the entire alcohol component can comprise a trifunctional alcohol, but where a less rigid foam product is desired, a difunctional alcohol such as ethylene glycol, or 1,4-butanediol can be utilized as part of the polyhydric alcohol component. Suitable glycols include diethylene glycol, triethylene glycol, polypropylene glycols, and polybutylene glycols, and the like. Suitable polyfunctional alcohols include glycerol, hexanetriol, trimethylolpropane, trimethylol ethane, mannitol, cyclohexanediol-1,4, glycerol monoethyl ether, hydroxy alkylated phenol-formaldehyde resins, and the like. The ratio of the polyhydric alcohol to the polycarboxylic acid can be expressed as the hydroxyl-carboxyl ratio, which can be defined as the number of moles of hydroxyl groups to the moles of carboxyl groups at a given weight of resin. This ratio can be varied over a wide range. Generally, however, a hydroxyl-carboxyl ratio of between 1.5:1 to 5:1 is used.

Alternatively, the halogen-containing alkyd resin can be either (1) the reaction product of components comprising (a) an adduct of hexahalocyclopentadiene and a polyhydric alcohol containing aliphatic carbon-to-carbon unsaturation, (b) a polyhydric alcohol containing at least three hydroxyl groups, and (c) a polycarboxylic compound; or (2) the reaction product of components comprising (a) an adduct of hexahalocyclopentadiene and a polyhydric alcohol containing aliphatic carbon-to-carbon unsaturation and (b) a polycarboxylic compound containing at least three carboxyl groups.

Typical polyhydric alcohol adducts of hexahalocyclopentadiene are 2,3-dimethylol-1,4,5,6,7,7-hexachlorobicyclo-(2.2.1)-5-heptene; 3 - (1,4,5,6,7,7 - hexachlorobicyclo-(2.2.1)-5-heptene-2-yl)-methoxy-1,2-propanediol; and the corresponding bromine and fluorine substituted compounds, and other such compounds disclosed in U.S. Patent 3,007,958.

Suitable polycarboxylic compounds useful in the practice of the invention are phthalic acid, fumaric acid, aconitic acid, adipic acid, 1,4-cyclohexadiene-1,2-dicarboxylic acid, trimellitic acid, tricarballylic acid, and the corresponding acid anhydrides, acid halides and acid esters.

A particularly desirable alkyd resin for use in this invention is prepared by reacting a polycarboxylic compound and a polyhydric alcohol, at least one of which is an adduct of hexahalocyclopentadiene as defined hereinbefore, in a ratio to provide more than one hydroxyl group for each carboxyl group. The reaction of the components is continued until a resin is produced having an acid number in the range of 20 to 90, preferably 25 to 60. Then an epoxide is introduced to the reaction mixture and the reaction is continued until the resin has an acid number of less than 20, preferably less than 10 and still more preferably less than about 2. The preferred reaction temperature is in the range of 150 to 200 degrees centigrade, but higher and lower temperatures can be employed. The hydroxyl number of the resulting resin generally is in the range of about 200 to 800, usually from about 300 to 600. The monomeric epoxides are generally preferred in preparing the composition, and typical examples of these are ethylene oxide, propylene oxide, butylene oxide, cyclohexene oxide, styrene oxide, allyl glycidyl ethers, glycidyl sorbate, and the like. The preferred compounds are alkylene oxides having up to 6 carbon atoms.

Suitable addition products of phenol-aldehyde condensation products are prepared by reacting together a fusible, organic solvent soluble condensation product of a phenol and an aldehyde containing condensate units having reactive phenolic hydroxyl groups, and mono oxirane ring compounds such as alkylene oxides. The phenol-aldehyde condensation products are well known in the art and can be prepared by well known methods. Examples of phenols which can be used in preparing the condensates include phenol itself or substituted phenols having the following general formula:

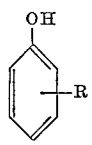

wherein R can be hydrogen, fluorine, chlorine, bromine, alkyl or alkenyl groups of 1 to 18 carbon atoms, alicyclic groups of 5 to 18 carbon atoms, or aromatic and aralkyl groups of 6 to 18 carbon atoms. Suitable substituted phenols include para-tertiary-butyl phenol, para-isooctyl phenol, para-benzyl phenol, para-cetyl phenol, para-cumyl phenol, para-chlorophenol, as well as the corresponding ortho and meta derivatives such as metabutyl phenol and orthobutyl phenol, as well as mixtures thereof. Suitable aldehydes for preparing the condensates generally have up to 8 carbon atoms and include formaldehyde or its low polymeric forms such as paraform or trioxane, acetaldehyde, benzaldehyde, furfural, glyoxal, and the like. The preferred phenol-aldehyde condensates are the novolac resins which are generally prepared by reacting 0.5 to 0.85 mole of aldehyde per mole of phenol, optionally in the presence of an acid catalyst such as sulfuric, or oxalic acid, or an alkaline catalyst such as ammonia, amines, and quaternary ammonium bases. Alternatively, the phenol-aldehyde condensate can be a resole which is prepared by reacting more than one mole of aldehyde per mole of phenol in the presence of the above-described alkaline catalysts.

The phenol-aldehyde condensates and products are preferably hydroxyalkylated by reaction with compounds containing a mono oxirane ring. Monomeric and polymeric epoxides can be used in this reaction. Typical mono epoxides includes ethylene oxide, propylene oxide, butylene oxide, cyclohexane oxide, styrene oxide, allyl glycidyl ether, glycidyl sorbate, and the like. The preferred mono epoxides are the mono epoxide-substituted hydocarbons, the mono epoxide-substituted ethers, sulfides, sulfones, and esters wherein the compounds contain up to 18 carbon atoms. Typical diepoxides are: cyclopentadiene dioxide and limonene dioxide. Examples of suitable polyepoxides are: epoxidized vegetable oils, and novolac polyglycidyl ethers. Many other epoxides can be used but the alkylene oxides containing up to 6 carbon atoms are generally employed. Catalysts for the hydroxy-alkylation step are the alkali metals, alkali or alkaline earth hydroxides, primary, secondary, and tertiary amines or basic alkali salts. Typical catalysts include sodium and potassium; sodium and potassium hydroxides; methyl, dimethyl, triethyl, and tripropyl amines and the like; and salts of strong bases and weak acids such as sodium acetate or benzoate. The hydroxy-alkylation reaction is generally carried out at temperatures in the range of 50 to 250 degrees centigrade, and result in the preparation of resins which preferably contain substantially no free reactive phenolic groups (less than about 5 percent of phenolic hydroxyl). Generally, in the preparation of rigid foams it is not desired to react more than 10 moles of the hydroxy alkylation agent per mole of phenolic hydroxyl.

Alternatively, hydroxy-alkylation can be carried out by reacting the phenol-aldehyde condensate with an alkylene halohydrin, such as ethyl chlorohydrin or glyceryl bromohydrin, in the presence of an alkali metal hydoxide, such as sodium or potassium hydroxide. The hydroxy-alkylation, can also be performed by reacting the phenol-aldehyde resin with an alkylene carbonate, such as ethylene or propylene carbonate, using a catalyst such as potassium carbonate.

The compositions of the invention contain as a third hydroxyl-containing component, an N,N,N',N'-tetrakis (2-hydroxypropyl)alykylene diamine wherein the alkylene radical contains 2 to 6 carbon atoms. Typical compounds are N,N,N',N' - tetrakis(2 - hydroxypropyl)ethylene diamine, N,N,N',N'-tetrakis(2-hydroxypropyl)propylene diamine; and N,N,N',N'-tetrakis(2-hydroxypropyl)hexamethylene diamine. By virtue of the presence of the amine groups in these compounds, they also function as catalysts for the urethane reaction.

In the neutral phosphorus compounds that are utilized in the compositions of the invention, the hydrocarbon radicals preferably contain from 1 to 20 carbon atoms. Compounds wherein the hydrocarbon radicals join to form a ring are also contemplated, such as phenyl ethylene phosphite. The alkyl groups can be substituted with a mixture of halogen atoms, such as mixtures of chlorine and bromine atoms. Typical phosphorus compounds that can be employed in accordance with the invention include the following compounds wherein R has the value defined hereinbefore: Third degree esters of phosphoric acid (tertiary phosphates),

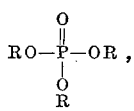

for example: trimethyl phosphate, triethyl phosphate, ethyl dimethyl phosphate, trilauryl phosphate, triphenyl phosphate, tricresyl phosphate, tribenzyl phosphate, phenyl ethylene phosphate, tris(β-chloroethyl)phosphate, tris(2,3-dichloropropyl)phosphate, and tris(2,3-dibromopropyl)phosphate; second degree esters of phosphonic acid (secondary phosphonates),

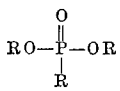

for example: dimethyl methylphosphonate, diamyl amylphosphonate, dilauryl methylphosphonate, diphenyl methylphosphonate, dibenzyl methylphosphonate, diphenyl cresylphosphonate, bis(chloropropyl)chloropropylphosphonate, bis(chloropropyl)propenyl-2-phosphonate, and bis(2,3-dibromopropyl) 2,3-dibromopropyl phosphonate; first degree esters of phosphoric acids (phosphinates),

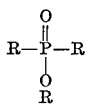

for example: methyl diethylphosphinate, benzyl diphenylphosphinate, methyl diphenylphosphinate, chloropropyl bis(chloropropyl)phosphinate, and butyl 2-bromoethyl phenyl phosphinates; tertiary phosphine oxides,

for example: trimethyl phosphine oxide, triphenyl phosphine oxide, tribenzyl phosphine oxide, tris(choloropropyl) phosphine oxide, and 2-bromoethyl diphenyl phosphine oxide; third degree esters of phosphorus acid (tertiary phosphites),

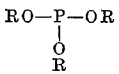

for example: triethyl phosphite, trilauryl phosphite, triphenyl phosphite, tribenzyl phosphite, phenyl ethylene phosphite, phenyl dimethyl phosphite, tris(β-choloroethyl)phosphite, and tris (2-bromoethyl)phosphite; second degree esters of phosphonous acids (secondary phosphinites),

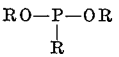

for example; dimethyl methylphosphonite, diphenyl methylphosphonite, dibenzyl methylphosphonite, dimethyl cresylphosphonite, bis(choloropropyl) chloropropyl phosphonite, and bis(bromopropyl)bromopropylphosphonite; first degree esters of secondary phosphine oxides (phosphinites),

for example: methyl dimethylphosphinite, phenyl diphenylphosphinite, methyl diphenylphosphinite, cholorpropyl bis(cholorpropyl)phosphinite, and 2,3-dibromopropyl diphenylphosphinite; tertiary phosphines,

for example; trimethyl phosphine, triphenyl phosphine, tribenzyl phosphine, tri(choloropropyl)phosphine, and 2-bromoethyl diphenyl phosphine. Sulfur analogues of the foregoing phosphorus compounds are also useful.

Various organic polyisocyanates can be used in preparing the compositions of the invention. Among these isocyanates are 2,4-tolylene diisocyanate, 2,6-tolylene diisocyanate, and mixtures thereof, and particularly the crude mixtures thereof that are commercially available. Other typical polyisocyanates include methylene-bis-(4-phenyl isocyanate); n-hexyl diisocyanates: 1,5-naphthalene diisocyanate; 1,3-cyclopentylene diisocyanate; p-phenylene diisocyanate; 2,4,6-tolylene triisocyanate; 4,4′,4″ - triphenylmethane triisocyanate. Higher isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred for use in the invention are the polyaryl polyisocyanates having the following generalized formula:

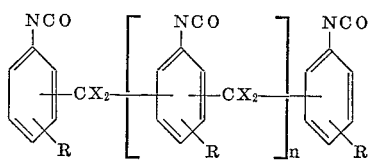

wherein R is selected from the group consisting of hydrogen, chlorine, bromine, alkyl having 1 to 5 carbon atoms, and alkoxy having 1 to 5 carbon atoms; X is selected from the group consisting of hydrogen, alkyl having 1 to 10 carbon atoms and phenyl; and $n$ has an average value of at least 1 and generally about 1 to 3. The preferred composition of this type is polymethylene polyphenylisocyanate which is a mixture of compounds having the following generalized formula:

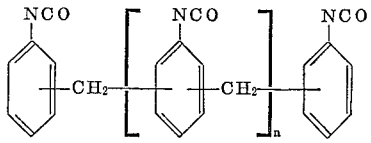

wherein $n$ has an average value of at least 1 and generally is from 1 to 3. Other typical compounds of this type include those wherein the R groups are chlorine, bromine, methyl or methoxy, and wherein the value of X is methyl or phenyl in the generic formula.

Any foaming agent commonly used in the art can be employed. These are generally those materials that are capable of liberating gaseous products when heated, or when reacted with an isocyanate. Preferably, foaming is accomplished by introducing a low boiling liquid into the catalyzed resin. The heat of reaction is then sufficient to expand the mixture to a foam stable enough to retain its shape until the resin gels. Suitable liquids are the fluorochlorocarbons boiling in the range of −30 to 50 degrees centigrade and mixtures thereof, for example, trichlorofluoromethane, trichlorotrifluoroethane, difluoromonochloroethane, and difluorodichloroethane. Also useful are mixtures of the fluorocarbons with chlorocarbons such as methylene chloride. Another foaming agent that is suitable for carrying out the foaming reaction at an elevated temperature is disclosed in U.S. Patent 2,865,869, which discloses and claims use of tertiary alcohols in the presence of strong concentrated acid catalysts. Examples of tertiary alcohols include: tertiary amyl alcohol; tertiary butyl alcohol; and the like. Examples of catalysts include sulfuric acid and aluminum chloride. Other foaming agents that can be used include the following: polycarboxylic acids, polycarboxylic acid anhydrides, dimethylol ureas, polymethylol phenols, formic acid and tetrahydroxy methylphosphonium chloride.

The reaction of the hydroxyl-containing components of the invention with the isocyanate components is catalyzed by a tertiary amine. Many such compounds are useful in the reaction but they generally have up to 20 carbon atoms. Typical of such compounds are the trialkylamines, such as trimethyl amine, triethyl amine, tributyl amine, diethyl cyclohexyl amine, dimethyl $C_{12}$ to $C_{18}$ amines, diethylene triamine and tetramethyl butane diamine. Also suitable are the morpholine compounds such as N-methyl morpholine, N-acetyl morpholine, N-phenyl morpholine, 4,4'-dithio morpholine, and the like, and the tertiary amine compounds having other functional groups such as diethyl ethanolamine, methyl diethanolamine, N-diethyl ethanolamine, N-diethyl aminoacetic acid, methyl iminodipropionic acid, dimethylamino propenitrile, N-methyl dipropylene triamine, dimethyl-(2-methoxy-ethyl)-amine, diethyl - (ethoxy-ethoxy-propyl) - amine, dimethylpiperazine, N-(2 - methoxy - ethyl)-piperidine, p-bis-(N-diethyl-amino-ethyl)-phenyl-ether, and the like. The preferred amine compounds are triethyl amine and tetramethyl guanidine. The amine compounds can be used in combination with other urethane reaction catalysts, such as organic tin compounds, for example, dibutyltin dilaurate.

In spray foam applications, the catalyst is employed in an amount sufficient to cause the foamable composition to rise and gel rapidly enough that it doesn't flow or sag when sprayed onto a vertical substrate or an overhead substrate, such as a ceiling. In accordance with this aspect of the invention, the foamable composition contains sufficient catalyst that the time from deposition of the composition to immobility of a one inch thick foam is up to 60 seconds, generally from 1 to 60 seconds. For application of the compositions to overhead substrates, the time interval is preferably 1 to 30 seconds for a one inch thick foam. The one inch thickness is chosen merely as a reference point, since spray foams can be prepared in thickness from a fraction of an inch to about 2 inches per pass. Moreover, the cream time of the foamable composition—the interval between deposition and beginning of expansion—should be less than 5 seconds. Various factors other than catalytic activity influence the expansion time of the foamable composition, for example, the substrate temperature, the temperature of the foamable composition and the like. Such auxiliary factors are determined in a given situation, before establishing a catalyst concentration required to provide the expansion time in the desired range. Generally, the amine catalysts are employed in the range of 0.2 to 10 parts per 100 parts of hydroxyl containing polymer, preferably in the range of 0.5 to 5 parts per 100 parts by weight.

In preparing the polyurethane compositions of the invention, the hydroxyl-containing components generally comprise from about 25 to 75 weight percent of the halogen-containing alkyd resin, from about 24 to 75 weight percent of the phenolic resin component, and from about 2 to 10 weight percent of tetrakis(hydroxypropyl) alkylene diamine. The neutral phosphorus compounds of the invention are employed in an amount of at least about 1 part, up to about 20 parts by weight per hundred parts of the hydroxyl-containing polymer. The preferred amount of the neutral phosphorus compound is from about 2 to about 10 parts by weight per 100 parts polymer. It is generally preferred to add the phosphorus compounds directly to the hydroxyl-containing polymer to reduce the viscosity, and subsequently to add the polyisocyanate and the foaming agent; however excellent results are obtainable when all the components are simultaneously mixed together. The hydroxyl-containing polymer and the polyisocyanate are preferably reacted in a ratio sufficient to provide about 85 to 115 percent of isocyanato groups with respect to the total number of hydroxyl and carboxyl groups in the hydroxyl-containing polymeric material and the foaming agent. The foaming agent is preferably employed in an amount sufficient to produce a foam having a density in the range of about one to six pounds per cubic foot. The reaction temperature generally ranges from about 20 to about 120 degrees centigrade, although higher and lower temperatures can be used. The stream temperatures can be adjusted to provide the foamable composition in a preexpanded or frothed condition, if desired.

Various additives can be incorporated in the polyurethane compositions to modify the properties thereof. For example, the fire-resistance of the compositions can be further improved by the addition of an antimony compound. Fillers, such as clay, calcium sulphate or ammonium phosphate can be added to lower the cost; components, such as dyes can be added for color, and fibrous glass, asbestos or synthetic fibers can be added to improve strength characteristics.

The compositions of the invention are useful in molded shapes such as slabs, blocks, buns and panels. They are especially useful when applied as polyurethane foams to a wide variety of substrates, i.e., iron, steel, aluminum and other metals, concrete, masonry, brick, tile, wood, manufactured wall composition boards, glass, as well as to synthetic resins and plastics such as polyesters, vinyl polymers, and the like. The compositions are useful in applying thermal insulation to refrigerated truck trailers, railroad cars of various types, industrial tanks, heat exchangers, industrial piping, chemical reactors and other equipment, and in building construction as well as in mines as an air seal. The substrate temperature can very widely, but will generally be in the range of 30 to 170 degrees Fahrenheit, preferably 60 to 130 degrees.

The following examples serve to illustrate the invention, but are not intended to limit it. All parts are by weight and temperatures in degrees centigrade, unless it is indicated otherwise.

The first three examples illustrate the preparation of alkyd resins that are particularly useful in preparing the compositions of the invention.

Example 1

12 moles of trimethylolpropane and 6 moles of 1,4,5,6,7,7 - hexachlorobicyclo - (2.2.1) - 5-heptene-2,3-dicarboxylic acid are reacted until an acid number of about 25 is achieved. Then gaseous propylene oxide is introduced into the reaction mixture in a nitrogen carrier gas until the acid number is reduced to less than 1. Consumption of propylene oxide is about 4 moles. The hydroxyl number of the product is 366.

Example 2

An alkyd resin is prepared by reacting 361 parts of 2,3 - dimethylol - 1,4,5,6,7,7-hexachlorobicyclo-(2.2.1)-5-heptene and 192 parts of trimellitic anhydride at 120 degrees centigrade in the presence of 0.5 part of sodium acetate catalyst. About 1,000 parts of toluene are used as a diluent for the reaction mixture. After one-half hour, the introduction of propylene oxide is commenced and heating is continued at 120 degrees centigrade until an acid number of nearly zero is achieved. The diluent is stripped under vacuum at 150 degrees centigrade leaving the resin product.

Example 3

An alkyd resin is prepared by mixing 361 parts of 2,3-dimethylol - 1,4,5,6,7,7 - hexachlorobicyclo - (2.2.1)-5-heptene, 92 parts of glycerol and 740 parts phthalic anhydride. The reaction mixture is diluted with 1,000 parts of toluene and is then heated at 150 degrees centigrade. After one-half hour, propylene oxide is introduced and the reaction is continued until the acid number of the resin approaches zero. Stripping of the diluent under vacuum leaves the resin product.

The following Examples 4 to 6 illustrate the preparation of the phenolic addition products that are particularly useful in preparing the compositions of the invention.

Example 4

First, 2,030 parts of a phenol-formaldehyde novolac resin containing an average of about 3.5 phenolic nuclei per molecule are introduced into a reactor, together with 7.2 parts of sodium hydroxide. Ethylene oxide (1,750 parts) is then sparged into the reactor, while maintaining the temperature in the range of 190 to 220 degrees centigrade. The resulting resin has a hydroxyl number of 290.

Example 5

To a mixture of 520 grams of a phenol-aldehyde resin such as employed in Example 4, and 600 grams of ethyl alcohol is added 880 grams of a 33 percent NaOH solution. The solution was heated to 88 degrees centigrade, and 443 grams of ethylene chlorohydrin is added over a one hour period. The reactants are refluxed until free of phenolic hydroxyl, the alcohol is distilled off and the resin is washed with hot water and dried.

EXAMPLE 6

A mixture of 312 grams of the phenol-aldehyde resin such as prepared in Example 4, 267 grams of ethylene carbonate and 1.5 grams of potassium carbonate is heated to 170 to 180 degrees centigrade under a nitrogen atmosphere. After 6 hours, the resin is free of phenolic hydroxyl and has a hydroxyl number of 357.

EXAMPLE 7

A resinous mixture was prepared by blending the following components; 60 parts of an alkyd resin such as prepared in Example 1; 30 parts of the addition product such as prepared in Example 4; 5 parts of N,N,N',N',-tetrakis(2-hydroxypropyl)ethylene diamine; 5 parts of tris(betachloroethyl) phosphate; 1.25 parts of tetramethyl guanidine, 1.25 parts of triethylamine, 1.0 part of a silicone-glycol co-polymer cell controller and 40 parts of tri-chlorofluoromethane. The foregoing blend of components was introduced to a mixing chamber at the rate of 3.3 pound per minute, together with polymethylene polyphenylisocyanate at a rate of 2.2 pounds per minute. The resulting foamable composition was sprayed through a nozzle, using compressed air as the propelling fluid, onto a vertically disposed steel partition. The composition foamed and gelled in about 30 seconds so that it did not sag on the partition, but rather formed a uniform polyurethane foam coating having a thickness of 1.5 inches. The resulting foam had the properties shown in Table 1.

EXAMPLES 8 AND 9

The procedure of Example 7 was repeated using 27 and 25 parts of trichlorofluoromethane blowing agent. The resulting foams had the properties shown in Table 1.

TABLE 1

| Example Number | 7 | 8 | 9 |
|---|---|---|---|
| Density, pounds per cubic foot | 1.6 | 2.0 | 2.2 |
| Compressive yield, pounds per square inch: | | | |
| Parallel | 20 | 30 | 34 |
| Perpendicular | 7 | 10 | 11 |
| Fire resistance by ASTM D-1692-59T | (¹) | (¹) | (¹) |
| Flame spread rating by ASTM E-84 | 25 | | |
| 5% volume expansion temperature °C | 123 | 125 | 131 |
| K-factor, B.t.u.-inch/hour-ft.²-F ° | 0.11 | 0.10 | 0.09 |
| Heat penetration, burn-through time, 1″ specimen, 1,900° F. propane torch, minutes | | 20 | |

¹ Non-Burning.

EXAMPLE 10

The following example shows the effect of using an N,N,N',N'-tetrakis(2-hydroxypropyl)alkylene diamine in the compositions of the invention. Polyurethane foams were prepared using two formulations having the components shown in Table II.

TABLE II

| Component | Formulation A, Parts by weight | Formulation B, Parts by weight |
|---|---|---|
| Alkyd resin of 380 hydroxyl number comprising product of propylene oxide and product of two moles of trimethylol propane per mole of chlorendic anhydride. | 50 | 50 |
| Addition product of ethylene oxide and phenol-formaldehyde novolac resin. | 45 | 40 |
| Tris(beta-chloroethyl) phosphate | 5 | 5 |
| Triethylamine | 0.35 | 0.35 |
| N,N,N',N'-tetrakis(2-hydroxypropyl) ethylene diamine. | (¹) | 5 |
| Silicone-glycol copolymer cell controller. | 1 | 1 |
| Trichlorofluoromethane | 30 | 30 |
| Polyarylpolyisocyanate | 76 | 82 |

¹ None.

The respective formulations were intimately mixed under the same conditions in a Martin-Sweets foam machine having a capacity of two pounds per minute, and the resulting foamable compositions were discharged into box molds measuring 9 x 13 x 15 inches and panel molds measuring 13 x 13 x 3 inches. The resulting foams were allowed to cure, and thereafter were subjected to physical tests which gave the results shown in Table III.

| Formulation | A | B | A | B |
|---|---|---|---|---|
| Mold type | (¹) | (¹) | (²) | (²) |
| Density, pounds per cubic foot | 1.73 | 1.66 | 2.09 | 2.14 |
| Compressive Yield, p.s.i.: | | | | |
| Parallel at 25° C | 18.7 | 24.6 | 20.9 | 27.9 |
| Perpendicular at 25° C | 6.9 | 9.3 | 13.1 | 18.5 |
| Compressive Modulus, p.s.i.: | | | | |
| Parallel at 25° C | 626 | 765 | 630 | 863 |
| Perpendicular at 25° C | 130 | 220 | 299 | 461 |
| Flammability: | | | | |
| ASTM D1692 | (³) | (³) | (³) | (³) |
| ASTM D757, inches per minute | 6.7 | 9.9 | 5.0 | 0.8 |
| Thermal Stability; 1 hour at 125° C.: | | | | |
| Percent volume change | +18.5 | +8.8 | +31.0 | +24.6 |
| Percent weight change | −1.6 | −1.1 | −1.7 | −1.2 |
| 5% Volume expansion temperature, °C | 105.8 | 108.8 | 92.5 | 105 |
| Hydrolytic Stability; percent volume change after 1 week at 70° C. and 100% relative humidity. | +27.3 | +15.4 | +40.4 | +18.7 |

¹ Box.
² Panel.
³ Non-Burning.

The foregoing data and results show that the polyurethane foams prepared in accordance with the invention (Formulation B) exhibited considerably better mechanical properties such as compressive yield and compressive modulus. Moreover, the thermal stability when tested by heating specimens at 125° C. for one hour were improved for the polyurethane foams made in accordance with the invention in that the products of the invention exhibited smaller volume and weight changes. Furthermore, the volume expansion temperature was improved for the polyurethane foams made in accordance with the invention. These values are obtained by determining the temperature at which a foam specimen undergoes a 5 percent increase in volume on heating. The hydrolytic stability of the polyurethane foams made in accordance with the invention was considerably better than the hydrolytic stability of the foams made from Formulation A. For the foams made in the box mold, the flammability as measured by ASTM test D757 was of the same order of magnitude, since at values greater than about 5 inches per minute, variations of one or two inches per minute are not very significant. However, with respect to the foam panels, the flammability as measured by ASTM D757 was much better for the polyurethane foam made in accordance with the invention, as compared with the foam made with Formation A. Accordingly, it is evident that the polyurethane foams containing N,N,N',N'-tetrakis(2-hydroxypropyl) alkylene diamine exhibited substantial superiority over the foams that do not contain this component.

While the invention has been described with reference to certain specific embodiments, it will be recognized by those skilled in the art that many variations are possible without departing from the spirit and scope of the invention.

I claim:
1. A composition suitable for use in preparing a polyurethane composition comprising the components:

(I) an alkyd resin having a hydroxyl number in the range of about 25 to 900 and selected from the group consisting of (1) the reaction product of components comprising (a) an adduct of hexahalocyclopentadiene and a polycarboxylic compound containing aliphatic carbon-to-carbon unsaturation and (b) a polyhydric alcohol containing at least three hydroxyl groups, (2) the reaction product of components comprising (a) an adduct of hexahalocyclopentadiene and a polyhydric alcohol containing aliphatic carbon-to-carbon unsaturation, (b) a polyhydric alcohol containing at least three hydroxyl groups and (c) a polycarboxylic compound, and (3) the reaction product of components comprising (a) an adduct of hexahalocyclopentadiene and a polyhydric alcohol containing aliphatic carbon-to-carbon unsaturation, and (b) a polycarboxylic compound containing at least three carboxyl groups; wherein the halogen is selected from the group consisting of fluorine, chlorine, bromine and mixtures thereof;

(II) an addition product of a phenol-aldehyde condensation product and a compound selected from the group consisting of a monomeric 1,2-epoxide, an alkylene halohydrin and an alkylene carbonate;

(III) a phosphorus compound having the formula

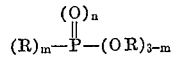

wherein $m$ is an integer from 0 to 3, $n$ is an integer from 0 to 1, and R is selected from the group consisting of alkyl, halogen-substituted alkyl, aralkyl, alkylaryl, and aryl; and (IV) an N,N,N',N'-tetrakis(2-hydroxypropyl)alkylene diamine, wherein the alkylene radical contains from 2 to 6 carbon atoms, in a proportion from 2 to 10 parts per 100 parts by weight of components (I), (II) and (IV).

2. The composition of claim 1 wherein component (I) is an alkyd resin having a hydroxyl number in the range of about 25 to 900 and comprising the reaction product of components comprising (a) an adduct of hexahalocyclopentadiene wherein the halogen is selected from the group consisting of fluorine, chlorine, bromine and mixtures thereof, and a polycarboxylic compound containing aliphatic carbon-to-carbon unsaturation, and (b) a polyhydric alcohol containing at least three hydroxyl groups; and component (II) is an addition product of a monomeric 1,2-epoxide and a phenol-aldehyde condensation product.

3. The composition of claim 2 wherein the adduct of hexahalocyclopentadiene is 1,4,5,6,7,7-hexachloro-(2.2.1)-5-heptene-2,3-dicarboxylic acid or anhydride.

4. The composition of claim 3 wherein the condensation product is a phenol-formaldehyde novolac resin.

5. The composition of claim 4 wherein the phosphorus compound is tris(β-chloroethyl)phosphate.

6. The composition of claim 2 which contains a tertiary amine catalyst in addition to component (IV).

7. The composition of claim 2 which contains a foaming agent.

8. A composition suitable for use in preparing a polyurethane foamable composition which can be applied to a substrate by spraying through a constricted zone, which comprises the components:

(I) an alkyd resin having a hydroxyl number in the range of about 25 to 900 and prepared by reacting a monomeric monoepoxide with the reaction product of (a) an adduct of hexachlorocyclopentadiene and a polycarboxylic compound containing aliphatic carbon-to-carbon unsaturation, and (b) a polyhydric alcohol containing three hydroxyl groups, said reaction product having an acid number in the range of 20 to 90; to produce a product having an acid number of less than 20;

(II) the addition product of a monomeric 1,2-epoxide and a phenol-formaldehyde novolac resin;

(III) a tertiary phosphate having the formula

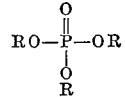

wherein R is selected from the group consisting of alkyl, halogen substituted alkyl, aralkyl, alkylaryl and aryl;

IV) a tertiary amine catalyst in an amount sufficient that the time from deposition of the foamable composition to immobility of a one inch thick foam is up to 60 seconds;

((V) an N,N,N',N'-tetrakis2-hydroxypropyl)alkylene diamine, wherein the alkylene radical contains from 2 to 6 carbon atoms, in a proportion from 2 to 10 parts per 100 parts by weight of components (I), (II) and (V); and (VI) a foaming agent.

9. A fire resistant, cellular reaction product comprising the following components:

(I) an alkyd resin having a hydroxyl number in the range of about 25 to 900 and selected from the group consisting of (1) the reaction product of components comprising (a) an adduct of hexahalocyclopentadiene and a polycarboxylic compound containing aliphatic carbon-to-carbon unsaturation and (b) a polyhydric alcohol containing at least three hydroxyl groups, (2) the reaction product of components comprising (a) an adduct of hexahalocyclopentadiene and a polyhydric alcohol containing aliphatic carbon-to-carbon unsaturation, (b) a polyhydric alcohol containing at least three hydroxyl groups and (c) a polycarboxylic compound, and (3) the reaction product of components comprising (a) an adduct of hexahalocyclopentadiene and a polyhydric alcohol containing aliphatic carbon-to-carbon unsaturation, and (b) a polycarboxylic compound containing at least three carboxyl groups; wherein the halogen is selected from the group consisting of fluorine, chlorine, bromine and mixtures thereof;

(II) an addition product of a phenol-aldehyde condensation product and a compound selected from the group consisting of a monomeric 1,2-epoxide, an alkylene halohydrin and an alkylene carbonate;

(III) a phosphorus compound having the formula:

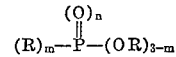

wherein $m$ is an integer from 0 to 3, $n$ is an integer from 0 to 1, and R is selected from the group consisting of alkyl, halogen substituted alkyl, aralkyl, alkylaryl, and aryl;

(IV) an N, N, N', N'-tetrakis (2-hydroxypropyl) alkylene diamine, wherein the alkylene radical contains from 2 to 6 carbon atoms, in a proportion from 2 to 10 parts per 100 parts by weight of components (I), (II) and (IV).

(V) an organic polyisocyanate; and (VI) a foaming agent.

10. The fire-resistant cellular reaction product of claim 9 wherein the organic polyisocyanate is a polyaryl polyisocyanate.

11. The composition of claim 9 wherein component (I) is an alkyd resin having a hydroxyl number in the range of about 25 to 900 and comprising the reaction product of components comprising (a) an adduct of hexahalocyclopentadiene wherein the halogen is selected from the group consisting of fluorine, chlorine, bromine and mixtures thereof, and a polycarboxylic compound containing aliphatic carbon-to-carbon unsaturation, and (b) a polyhydric alcohol containing at least three hydroxyl groups; and component (II) is an addition product of a monomeric 1,2-epoxide and a phenol-aldehyde condensation product.

12. The composition of claim 11 wherein the adduct of hexahalocyclopentadiene is 1,4,5,6,7,7-hexachloro-(2.2.1)-5-heptene-2,3-dicarboxylic acid or anhydride.

13. The composition of claim 12 wherein the condensation product is a phenol-formaldehyde novolac resin.

14. The composition of claim 13 wherein the phosphorus compound is tris($\beta$-chloroethyl)phosphate.

15. The composition of claim 11 which contains a tertiary amine catalyst in addition to component (IV).

References Cited

UNITED STATES PATENTS

| | | | |
|---|---|---|---|
| 2,779,689 | 1/1957 | Reis | 117—104 |
| 2,996,474 | 8/1961 | Voigt | 260—42 |
| 3,075,927 | 1/1953 | Lanham | 260—2.5 |
| 3,137,662 | 6/1964 | Recktenwald | 260—2.5 |
| 3,156,659 | 11/1964 | Robitchek | 260—2.5 |
| 3,171,819 | 3/1965 | Powanda | 260—2.5 |
| 3,208,959 | 9/1965 | Gmitter | 260—2.5 |
| 3,257,337 | 6/1966 | Schoepfle et al. | 260—2.5 |

FOREIGN PATENTS 919,067   2/1963   Great Britain.

OTHER REFERENCES

Abbott, et al., "Spray Application of Ryid Vretahne Foams," S.P.E. Journal, May, 1962, pp. 561–567.

DONALD E. CZAJA, *Primary Examiner.*

M. B. FEIN, *Assistant Examiner.*

U.S. Cl. X.R.

260—75, 77.5; 161—190